United States Patent [19]
Gunner et al.

[11] Patent Number: 4,807,958
[45] Date of Patent: Feb. 28, 1989

[54] METHOD OF INTERCONNECTING OPTICAL FIBER CABLES AND CONNECTOR THEREFOR

[75] Inventors: Colin Gunner, Bitterne, Great Britain; Paolo Boero, Milan, Italy

[73] Assignee: Societa' Cavi Pirelli S.p.A., Milan, Italy

[21] Appl. No.: 50,061

[22] Filed: May 13, 1987

[30] Foreign Application Priority Data

May 19, 1986 [IT] Italy .................. 20479 A/86

[51] Int. Cl.$^4$ .............................. G02B 6/38
[52] U.S. Cl. .................. 350/96.21; 350/96.18; 350/96.20
[58] Field of Search ........... 350/96.15, 96.18, 96.20, 350/96.21, 96.22

[56] References Cited

U.S. PATENT DOCUMENTS

| | | | |
|---|---|---|---|
| 4,265,511 | 5/1981 | Nicia et al. | 350/96.18 |
| 4,304,461 | 12/1981 | Stewart et al. | 350/96.18 |
| 4,327,963 | 5/1982 | Khoe et al. | 350/96.18 |
| 4,451,115 | 5/1984 | Nicia et al. | 350/96.18 |
| 4,468,087 | 8/1984 | Milan et al. | 350/96.18 |
| 4,632,505 | 12/1986 | Allsworth | 350/96.21 |
| 4,653,847 | 3/1987 | Berg et al. | 350/96.20 |

*Primary Examiner*—William L. Sikes
*Assistant Examiner*—Frank González
*Attorney, Agent, or Firm*—Brooks, Haidt, Haffner & Delahunty

[57] ABSTRACT

A method for interconnecting optical fiber cables and a connector for use in such method. In the method, the spherical lenses normally used to couple the fibers is replaced by a spherical body of smaller diameter and the fibers are brought into contact with such body and fixed in axial position. Thereafter, the body is replaced by the lenses normally used which provides the correct spacing between the latter lenses and the ends of the optical fibers. The connector has housings for the normal lenses part of which is removable for the substitution of the spherical body during adjustment of the positions of the optical fibers.

8 Claims, 1 Drawing Sheet

METHOD OF INTERCONNECTING OPTICAL FIBER CABLES AND CONNECTOR THEREFOR

The present invention relates to a method for axially positioning the end of an optical fiber within the focus of a lens having a spherical form and which is lodged in a conical seat of an expanded beam connector.

The invention also relates to an expanded beam connector of the type provided with lense having a spherical form for the optical coupling and which is suitable for using said method for the positioning of the ends of the optical fibers.

As is known, in expanded beam connectors, the ends of the fibers to be coupled are positioned within the focus of facing lenses which are capable of producing a collimated expanded beam. In this manner, the problems of positioning of the two halves of the connector are reduced, and the quantity of light transmitted between the fibers is increased.

In fact, since the light beams are more ample, the connector is less sensitive to the misalignments of the two halves and, in particular, it can even permit a certain tolerance in the reciprocal axial positioning of the two halves themselves without giving rise to any appreciable power losses in the light signals transmitted.

However, for this purpose, it is necessary for the ends of each optical fiber to be positioned (and stably fixed there) with extreme precision within the focus of the corresponding lens.

In particular, in expanded beam connectors which utilize lenses having a spherical form and which have a refractive index of less than 2, the focus of the lens is found at a certain distance from the surface of the lens and hence, the exact axial positioning of the associated optical fiber end is rather complex. In fact, if the focus were to be on the surface of the lens, i.e. if the lens had a refractive index equal to 2, it would be sufficient to cause the end of the fiber to contact the lens, by using the necessary care. If instead, the focus is outside the lens, the end of the fiber must be positioned at a distance of a few hundreds of microns from the surface of the lens within a very restricted tolerance.

One known solution uses a complex instrumentation for realizing the connection. In fact, this technique requires a micrometrical apparatus for causing the optical fiber to advance and the use of quite sophisticated instruments for determining the point which would guarantee an optimal coupling. The results obtained are evidently very good, but the utilization of the connector is strongly conditioned on the use of said instruments, and the cost involved in using the connector is also very high.

For overcoming these difficulties of the positioning, some connectors of the known type interpose, in contact with the lens, a layer of transparent material. Against this layer there abuts the end of the optical fiber. This solution is rather costly from the construction point of view and is also complex since the quality of the coupling depends upon the dimensions of the intermediate layer, on its refractive index, upon the presence of adhesives, etc.

One object of this invention is to overcome said drawbacks and the limitations of the known technique by an extremely simple and precise connecting method and a connector which is of simple and economic construction for use in said method.

In accordance with the preferred method of the invention for axially positioning the end of an optical fiber inside the focus of a spherical shaped lens which is positioned in a conical seat of an expanded beam connector, the following steps are employed:

(a) a spherical body having a diameter less than that of the spherical lens is temporarily positioned in the conical seat;

(b) the fiber is advanced until the end thereof is in contact with the spherical body and the fiber is fixed in position; and (c) the spherical body is removed from the conical seat and the spherical shaped lens is substituted for the spherical body and secured in its proper position.

The preferred expanded beam type of connector for optical fibers of the invention comprises two axially aligned cylindrical bodies which are adapted to contain and fix the ends of the optical fibers and which are positioned with respect to the associated spherical shaped lenses, the said lenses being housed in conical seats at the facing ends of these cylindrical bodies, such connector comprising, for each lens, a lens holder which is applicable in a removable manner to the cylindrical body and of having, at one end, an opening of a diameter smaller than that of the lens and said connector being further characterized by the fact of comprising at least one cap which is applicable to the end of the cylindrical body and which contains a sphere of a diameter smaller than that of the spherical lens of the connector.

Other objects and advantages of the present invention will be apparent from the following detailed description of the presently preferred embodiments thereof, which description should be considered in conjunction with the accompanying drawings in which.

Figure 1:
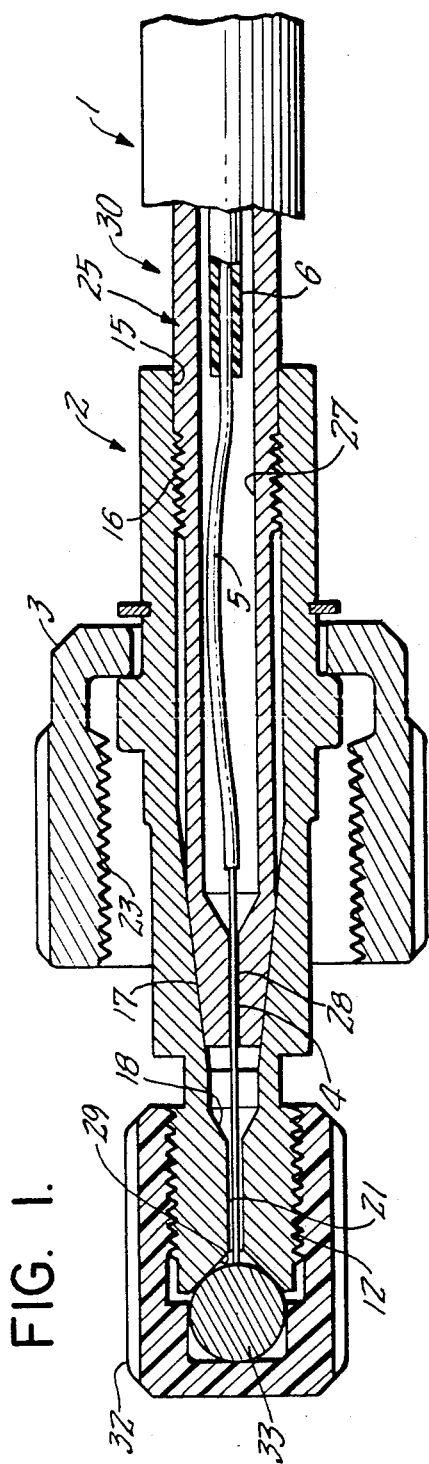
FIG. 1 illustrates in longitudinal section the positioning, according to the invention, of an optical fiber in one-half of the connector.

The expanded beam connector shown in the drawings is of the type suitable for connecting the ends of two elementary optical fiber cables each comprising an optical fiber having an adherent protective covering, reinforcing elements, such as aramide threads, and an outer plastic sheath, for example, made of polyurethane.

The optical fiber cable structure described is only one example of the type of cable to which the invention may be applied, since the method of the invention is also applicable to various types of optical fiber cables having one or more optical fibers, as well as to optical fibers which are otherwise protected and reinforced, instead of cables. Since the structure of the light transmitting elements to be connected is irrelevant, it will not be described in any detailed manner herein.

Figure 2:
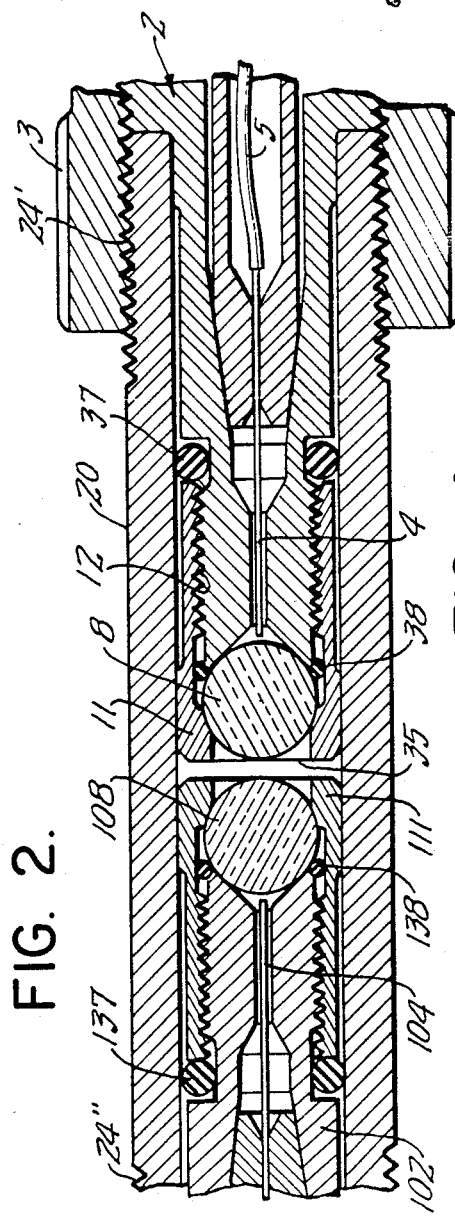
FIG. 2 illustrates in partial longitudinal section, the central part of the assembled connector, wherein the ends of the optical fibers have been positioned by using the method according to the invention.

With reference to FIG. 2, the connector comprises two alike cylindrical bodies 2 and 102 housed inside a sleeve 20 which is provided with threads 24' and 24" at its extremities for securing the cylindrical bodies 2 and 102 to the sleeve 20 by means of two ring-nuts which engage the cylindrical bodies in the axial sense, (only one of the rings, ring 3 being shown in FIG. 2).

Each of the cylindrical bodies 2 and 102 bears, respectively, upon one side of the spherical lenses 8 and 108 mounted, respectively, in lens holders 11 and 111, and inside the foci of the said lenses, there is positioned the ends of optical fibers 4 and 104, which are provided with protective coverings 5 and 6 (FIG. 1) and which penetrate into the cylindrical bodies 2 and 102 from the sides opposite to the lenses. In view of the symmetry of the structure, only the cylindrical body 2 will be described in detail because the cylindrical body 102 is identical to it.

As shown in FIG. 1, the cylindrical body 2 is perforated axially for housing and holding the optical fiber 4, and has a cylindrical hole 15 provided with a screw-thread 16 extending for a length into the cylindrical body 2.

Successive taperings 17, 18 reduce the diameter of the hole 15 to an axial channel 21 having a diameter which is a little more than that of the optical fiber 4 bared of any protective coverings. In its last portion, the axial channel 21 opens upon a conical entrance seat 29 which constitutes the lodging seat of the lens and which acts to center the position of the lens with respect to the cylindrical body 2.

The seat 29 has a conical form. However, this term must be taken to mean, more generally, any cavity having a symmetry of rotation wherein the intersections, with planes perpendicular to the axis of symmetry, are circumferences with a progressively decreasing diameter.

The outer surface of the terminal portion of the cylindrical body 2 is provided with a screw thread 12, the functions of which will be stated further on.

In the cylindrical hole 15, there is housed a holding device 25 of a known type, also called a neck, which allows for fixing the fiber 4 in position. Said device 25 has a cylindrical cavity 27 which reduces into a narrow channel 28 through which the optical fiber passes to the axial channel 21.

The head of the device 25, which has a truncated-cone shape in correspondence to the channel 28, has longitudinal cuts. Because of the equal truncated-cone shape of the surface 17 where the head of the blocking device is housed, such cuts allow, as the device 25 advances into the cavity 15, for applying a compressing action on the fiber which is appropriate for keeping the fiber in a fixed position relative to the device 25 itself, and the device 25 is secured to the cylindrical body 2 by means of the screw thread 16.

The terminal portion of the optical fiber is bared of any protective covering, whereas the part contained in the cylindrical cavity 27 has a length of the primary covering 5, and then, there is the secondary protective covering 6 made, for example, of nylon.

The attaching of the elementary cable 1 to the cylindrical body 2 is not shown since it is of the known type. It can, for example, be a circumferential, deformable, cylindrical, metallic collar which secures the cable at the cylindrical extremity 30 of the device 25, and a thermo-shrinkable sleeve of a sufficient length for covering and securing together, the polyurethane sheath of the cable 1, the metallic collar and part of the cylindrical body 2.

As shown in FIG. 1, the optical fiber 4 is disposed in the cylindrical cavity 27 with a certain amount of excess length for permitting the necessary axial movements before the final positioning.

FIG. 2 shows a cross-section of the central portion of the assembled connector where one can observe that the ends of the fibers 4 and 104 are spaced apart from the surfaces of the lenses 8 and 108 because the focus of these lenses is external thereto. Moreover, the two lenses are separated, and the distance between them is not critical in view of the fact that the rays of light, radiating from the spherical lenses, substantially coincide. However, the positioning of the fiber ends, with respect to the lenses, is critical.

The method, according to the invention, for positioning the end of an optical fiber will be described with reference to FIG. 1.

Once the optical fiber has been prepared (with its covering removed), it is introduced into the device 25, and the cable 1 is fixed securely to the device 25 itself, for example, as described previously.

After the fixing of the cable, the optical fiber protrudes from the device 25 in such a way as to guarantee, when positioned with its end in the focus of the lens, the already stated excess length in the cavity 27.

At this point, there is applied, on the threaded extremity of the cylindrical body having the threads 12, a threaded ring or cap 32 made of a plastic material, inside which there is housed a metallic calibration sphere 33 of a diameter smaller than the diameter of the spherical lens 8 of the connector, the diameter of which is calculated in a way which will be described further on.

The cap 32 is screwed on the cylindrical body in order to bring the calibrated sphere 33 in contact with the conical seat 29. Since the diameter of the sphere 33 is less than that of the lens 8, the sphere penetrates farther into the conical seat 29. The device 25 is inserted into the cylindrical body 2 until the fiber 4 contacts the calibrated sphere 33 and becomes fixed in said position during turning of the device 25 into the cylindrical body 2 and engagement thereof with the screw-threads 16.

Once the contact has been made and the fiber 4 is fixed in position, the cap 32 with the calibrated sphere 33 is removed and replaced by the lens holder 11 and the lens 8 (FIG. 2). The lens holder 11 has a tubular structure, and it is provided with a threaded inner portion which engages the threads 12. The lens holder 11 is turned until the correct positioning (and fixing) of the lens 8 with respect to the cylindrical body 2 is obtained. For the reason which has been stated previously, the surface of the lens 8 (FIG. 2) will be spaced apart from the end of the fiber 4 and will be positioned precisely in the focus of the lens 8.

A similar procedure is carried out for the cylindrical body 102 for which the same cap 32 and sphere 33 is utilized, and thereafter, the two cylindrical bodies are inserted into the sleeve 20 as shown in FIG. 2 with the introduction of two sealing rings 37 and 137 and locking of the ring nuts, e.g. the nut 3, and for thus realizing the desired optical interconnection.

As shown in FIG. 2, the lens holder 11 has the form of a hollow cylindrical body, threaded internally at one of its extremities for securing it to the cylindrical body 2 and is provided, on its other extremity, with an opening or aperture 35 having a diameter, or transverse dimension smaller than the diameter of the spherical lens 8 which is held inside the lens holder 11. Elastic rings 38 and 138 can be used for making impermeable the zone between the back of the lenses 8 and 108 and the front side of the fibers.

Figure 3:
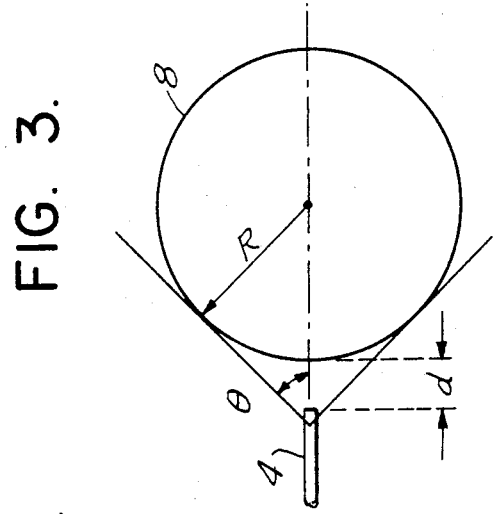
FIG. 3 is a diagram illustrating the method for calculating the diameter of the calibrated spherical body.

FIG. 3 shows the elements which come into play when calculating the diameter D of the calibrated sphere 33. The end of the optical fiber 4 is placed at a distance d from the surface of the lens 8 of a radius R, and with θ the half-angle of the cone for positioning the lens.

The calibrated sphere 33 has a diameter D, as given by the following formula:

$$D = 2R - 2d \sin \theta / (1 - \sin \theta)$$

valid for a conical cavity and where:
R = the radius of the lens;
d = the desired distance from the end of the fiber to the surface of the lens; and
θ = one-half the angle of the apex of a cone having its apex at the focus point and its surfaces tangent to the surface of the lens.

The sphere 33 is constructed from any whatsoever material, e.g. metal, glass, plastic, etc., provided that it is suitable for obtaining the necessary dimensional tolerances.

Figure 4:
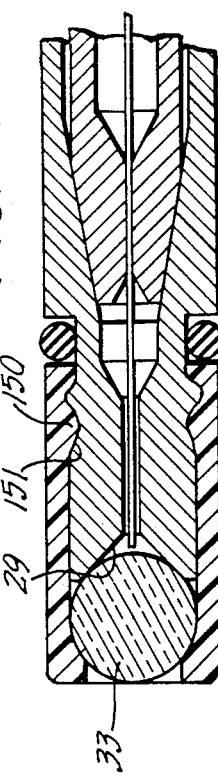
FIG. 4 is a fragmentary longitudinal section of a portion of a modified embodiment of the connector.

It will also be apparent that the means for positioning the calibrated sphere 33 in the conical seat 29 can be different from the one illustrated. For example, the cap 132 illustrated in FIG. 4 is made at least partially of an elastic material, and it is applied to the extremity of the cylindrical body 2a by forcing it over such extremity. It is held in position by means of a coupling between a projection 150 and the groove 151, respectively, on the cap 132 and on the cylindrical body 2a. With this solution, a pre-established elastic force is obtained for maintaining the calibrated sphere 33 centered in the conical seat 29.

The component formed by the cap and by the calibrated sphere housed in it is an integral part of the disassembled connector, and it can be a component to be discarded after use.

The illustrated connector, and others which can be constructed according to the principles of the invention for connecting the ends of two or more optical fibers, comprises a cylindrical body with a conical seat for the spherical lens and a lens holder which is not permanently fixed to the cylindrical body but rather, is separable and removable from the cylindrical body along with the lens. Moreover, the lens holder has an aperture for the lens which is smaller than the lens itself and, in particular, if the aperture is circular, the aperture has a diameter smaller than that of the lens itself so as to fix the lens axially once it is applied on the cylindrical body. Morever, said lens holder is interchangeable with the cap which holds the calibrated sphere.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Method for axially positioning the end of an optical fiber with respect to a spherical shaped lens in a conical seat of a connector, said method comprising:
    before finally placing said lens in said seat, inserting in said seat a spherical body of a diameter smaller than the diameter of said lens;
    putting said fiber into a position in which the end thereof is in contact with said spherical body;
    securing said fiber in said position;
    removing said spherical body from said seat and placing said lens in said seat; and
    securing said lens in said seat.

2. Method as set forth in claim 1 wherein said seat is provided at the end of a cylindrical body having means for receiving a housing for said lens and for holding said lens against said seat and wherein said spherical body is inserted in said seat by means of a spherical body holder engageable with said spherical body and said means.

3. Method as set forth in claim 1 wherein said spherical body has a diameter determined from the formula:

$$D = 2R - 2d \sin \theta / (1 - \sin \theta)$$

where R is the radius of said lens, d is the desired distance of the end of the optical fiber from the surface of said lens and θ is one-half of the apex angle of a cone with its apex at the focus point of said lens and its surfaces tangent to the surface of said lens.

4. An expanded beam connector for interconnecting a pair of optical fibers, said connector comprising:
    a cylindrical body having a portion at one end thereof forming a coincal seat and having an opening axially thereof for the passage of one of said pair of optical fibers;
    a spherical lens mounted in said body against said seat;
    a lens holder removably mounted on said cylindrical body at said end thereof with said lens intermediate said lens holder and said cylindrical body and engaging said cylindrical body for holding said lens against said seat, said lens holder having an opening axially aligned with the axis of said cylindrical body for the passage of light energy passing through said lens;
    a cap comprising a cylindrical member engageable with said cylindrical body at said end thereof in place of said lens holder and said lens; and
    a spherical body having a diameter less than the diameter of said spherical lens.

5. A cap as set forth in claim 4 wherein said spherical body has a diameter determined from the formula:

$$D = 2R - 2d \sin \theta / (1 - \sin \theta)$$

where R is the radius of said lens, d is the desired distance of the end of the optical fiber from the surface of said lens and θ is one-half of the apex angle of a cone with its apex at the focus point of said lens and its surfaces tangent to the surface of said lens.

6. A cap for the expanded beam connector as set forth in claim 4 wherein said cap has internal screw threads and wherein said cylindrical body has screw threads at said end thereof engageable with said internal screw threads of said cap.

7. A cap as for the expanded beam connector set forth in claim 4 wherein said cap is made of a stretchable and resilient material and has an internal peripheral projection and wherein said cylindrical body has a peripheral groove at said end thereof for receiving said peripheral projection with said spherical body against said seat.

8. An expanded beam connector for interconnecting a pair of optical fibers, said connector comprising:

a spherical lens of a predetermined diameter;

an elongated cylindrical body having a portion at one end thereof forming a coincal seat coaxial with the axis of said body, said body having an axial passageway for receiving one of said pair of optical fibers and extending from said seat in a first direction away from said seat, said passageway having an entrance at said seat and having a diameter substantially equal to the diameter of the optical fiber to be received therein and smaller than said diameter of said lens, said conical seat increasing in diameter in a second direction opposite to said first direction and from a diameter less than said diameter of said lens at said entrance of said passageway to a larger diameter at the portion thereof spaced from said entrance of said passageway in said second direction, the axial depth of said coincal seat and the diameters thereof being selected so that when said spherical lens is in engagement with said coincal seat, the surface of said spherical lens is spaced from said entrance of said passageway but when a spherical body of a diameter smaller than said diameter of said spherical lens is in engagement with said conical seat, the surface of said spherical body is closer to said entrance of said passageway than said surface of said spherical lens, said spherical lens being mounted in and against said conical seat with its surface spaced from said entrance of said passageway, a lens holder removably mounted on said cylindrical body at said end thereof with said spherical lens between said lens holder and said conical seat, said lens holder and said cylindrical body having interengaging means for holding said lens holder against said spherical lens and thereby holding said spherical lens against said coincal seat and said lens holder having an opening therethrough axially aligned with said axis of said cylindrical body and of a diameter smaller than said diameter of said spherical lens.

* * * * *

UNITED STATES PATENT AND TRADEMARK OFFICE
CERTIFICATE OF CORRECTION

PATENT NO. : 4,807,958

DATED : February 28, 1989

INVENTOR(S) : Gunner et al

It is certified that error appears in the above-identified patent and that said Letters Patent is hereby corrected as shown below:

Col. 6, line 27, change "coincal" to --conical--;

Col. 7, lines 3, 17 and 20, change "coincal" to --conical--;
Col. 8, line 16, "coincal" should read --conical--.

Signed and Sealed this

Twenty-fourth Day of October, 1989

Attest:

DONALD J. QUIGG

*Attesting Officer*   *Commissioner of Patents and Trademarks*